Figure 1:
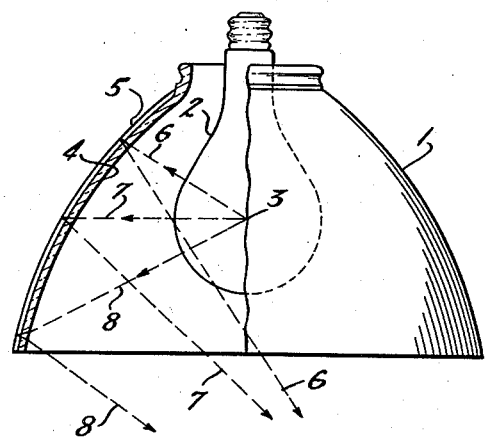

May 29, 1951     I. MOCKRIN ET AL     2,554,952

TITANIA-CONTAINING SILICATE GLASS

Filed Sept. 12, 1946

INVENTORS
ISADORE MOCKRIN and
ARNOLD E. PAVLISH.
BY
ATTORNEY

Patented May 29, 1951

2,554,952

UNITED STATES PATENT OFFICE 2,554,952

TITANIA-CONTAINING SILICATE GLASS

Isadore Mockrin, Philadelphia, Pa., and Arnold E. Pavlish, Columbus, Ohio, assignors, by mesne assignments, to Holophane Company, Inc., New York, N. Y., a corporation of Delaware Application September 12, 1946, Serial No. 696,606

1 Claim. (Cl. 106—52)

The present invention relates to titania-containing silicate glass, and is more particularly directed toward the manufacture of glass for use in pressed glass reflectors for controlling light for illumination, the glass having an index of refraction higher than that of the usual glass employed in such commercial articles.

Owing to high clarity, the melting, pressing and working qualities, permanence and weathering and reasonable cost, glass of the silica-soda-lime type has heretofore been commonly used in the manufacture of pressed glass articles such as reflectors, refractors and many other forms of pressed glass merchandise. Not only does this glass have these properties, but it is a comparatively light weight glass with an index of refraction of 1.5, a specific gravity of about 2.5 and a coefficient of expansion of approximately 85 times $10^{-7}$ cm./cm./° C.

Not only does an increase in the refractive index of the glass mean that there is a greater bending of the rays on entering the glass of a reflector, but there is a corresponding decrease in the critical angle of the medium. As the critical angle decreases, the width of the angular zone in which total internal reflection can occur is increased. Glass with higher index of refraction in illuminating reflectors has been desired because of its ability to control by reflection more of the light, but has not been used heretofore in commercial lighting reflectors. High index glasses, typically lead glasses, are used in optical work and in the manufacture of spectacular glassware, where costs permit and the undesirable qualities such as high weight of such glass do not impair its usefulness in the particular instance. They, however, have one or more undesirable features rendering their use impractical for the purpose of the present invention. Glass for such purposes must be made at reasonable cost and it must be able to withstand operating conditions which the high index refraction glasses heretofore available, have been unable to satisfy.

The present invention aims to produce glass compositions and articles made from the same wherein as many of the desirable properties of silica-soda-lime glass are retained as possible, and at the same time an index of refraction substantially higher than 1.5 is obtained.

The index of refraction of vitreous silica is only about 1.4585. As the typical silica-soda-lime glass has from 70% to 75% silica, its index of refraction is low, the other constituents effecting an increase to about 1.52. In the search for a suitable glass, investigation was directed toward the substitution of other oxides for silica so as to produce a suitable glass of the desired index of refraction. It is well known that high index glasses can be produced by the substitution of numerous oxides for silica, but the resulting glasses are objectionable for the purpose of the present invention owing to their weight, workability, expansion, and color. In this work glasses were developed which eliminated the objectionable features of the well known glasses.

Titania in amounts up to 30% was found to produce progressively increasing index of refraction with a tendency toward yellow or amber color, and zirconia in amounts up to nearly 30% produced a greenish glass with moderate increase in index of refraction.

The index of refraction increases in accordance with the amount of titania or zirconia employed in the glass, yet the increase obtained in index where there was less than 10% of either or both of these oxides, is too small to be of economic advantage in increasing the output of reflected light from articles made from the glass composition.

While titania has more effect on the index than the zirconia, it affects the color of the glass tending to make it somewhat yellow and further investigations indicate that the substitution of barium oxide for some of the lime would make an improvement in the color.

In making up glass for the purpose, the raw materials used for the silica, sodium, calcium, magnesium and barium compounds will be of the usual grade of purity commonly employed in manufacturing glass of this character, and the zirconium and titanium compounds can also be of commercial grade, preferably low in iron, aluminium or other metal of reducing nature.

As the glass batches employed in carrying out the present invention are related back to silica-soda-lime glass, one can assume that the formulations employed are based on the substitution of either $ZrO_2$ or $TiO_2$, or both, for $SiO_2$, the substitution of $K_2O$ for part of the $Na_2O$, and the substitution of BaO or MgO in varying proportions for the CaO of the typical formula. This typical or basic formula for the silica-soda-lime glass based on weight of oxides can be approximately 73% $SiO_2$, approximately 17% $Na_2O$ and approximately 8% CaO and approximately 2% minor ingredients. For the $Na_2O$ one can substitute varying amounts of $K_2O$ up to not more than 12%. It was also found that substitution of $K_2O$ for some of the $Na_2O$ would make an improvement in the color. The alkalis, $Na_2O$ and $K_2O$, singly or combined, should range from about 5% to about 27.5% and the alkaline earths singly or combined should range from 0% to about 12.5%.

In as much as the effect on the index of refraction of the addition of $TiO_2$ or $ZrO_2$ is not of enough practical consequence in percentages less than 10% (by weight) of either or of both combined, there would always be at least 10% of titania or zirconia substituted for silica and as the upper limit of zirconia and titania imposed by color and unworkability of melt is in the region of about 25% to 30% for these elements singly or combined.

While it is possible to substitute titania or zirconia, singly, for silica in amounts up to about 25 to about 30%, titania and zirconia cannot be added in combination with one another in any such amounts. The two oxides may be used in combination in percentages totaling up to about 30%, and the most desirable glasses were produced when not more than 15% of each oxide was used. At least 10% of each oxide was found to be essential in order to provide a commercially advantageous increase in the index of refraction.

Excellent results have been obtained from glass compositions employing 15% $TiO_2$, 9½% BaO, 57½% $SiO_2$ and 18% alkali, all of which may be $Na_2O$ or up to 6% $K_2O$.

The various constituents required for the formulation are thoroughly mixed and the batch melted in substantially the same way as the ordinary silica-soda-lime batch, care being taken to maintain an oxidizing atmosphere. This material can be worked in very much the same manner as the silica-soda-lime glass and manufactured into pressed glass articles in the same way. It has substantially the same characteristics in the melting, working and molding operation and has substantially the same weathering and permanence qualities, a specific gravity of 2.7 to 2.95, a cofficient of expansion of approximately 85 times $10^{-7}$ and indexes of refraction which range from 1.57 to 1.65.

Figure 2:
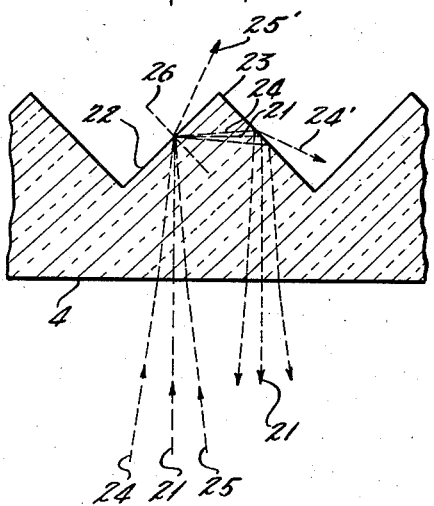

The value of a higher index of refraction than that customarily used for prismatic reflectors is indicated in the accompanying drawings in which Figure 1 is a section illustrating reflector profile and Figure 2 is a section illustrating prism contour.

Figure 1 shows a typical prismatic reflector as used for lighting purposes in factories and many other working areas. The figure shows the reflector 1, one-half in section, and the lamp 2 within the reflector with light center 3. Light rays emanating from 3 strike the inside surface of the reflector 4 and pass through to the prisms on the outer surface 5 where they are reflected twice and returned back through the inner surface 4 to pass out of the open mouth of the reflector. Typical light rays 6, 7, and 8 are indicated in this process of reflection.

The operation of these prisms is shown in Figure 2. This is a horizontal cross section through the wall of the reflector with the prisms on the outside. Light ray 21 comes from the center of the lamp filament, strikes the inner surface 4 of the reflector and passes through to the outer surface where it strikes one side of the prism. Typically, this prism is a 90° prism and the light ray 21 strikes the prism at an angle of incidence of 45°, this being the angle between the ray and the normal to the surface. The normal is indicated by dotted line 26. With an index of refraction of approximately 1.5, which is typical in glass used for prismatic reflectors, the critical angle is 42°. Consequently any light striking a glass surface from within the glass at an angle of incidence greater than 42° is totally reflected. Light ray 21 is, therefore, totally reflected from the prism surface 22 and crosses over to the other side of the prism 23. Here, exactly the same action occurs and the light ray is totally reflected and sent back through the inner surface of the glass in the desired direction. In the horizontal cross section of Figure 2, the light ray is returned in exactly the direction from which it came, but in elevation there will be an angular difference between the entering light ray and the reflected light ray as indicated in Figure 1.

The lamp filament 3 is not a point and due to its physical size, some light rays strike the reflector at angles other than indicated for light ray 21. Light rays 24 and 25 are indicated as coming from extreme edges of the lamp filament 3. These light rays pass into the glass at the inner surface 4 and are refracted slightly. Light ray 25 strikes the outer surface of the prism at an angle of incidence somewhat less than that of light ray 21 as indicated in the figure. If this difference in angular direction of the two rays in glass is 3° or less, light ray 25 will still be reflected from the inner surface 22 of the prism because the angle of incidence will be 42° or greater. However, when the angle between light rays 21 and 25 in glass becomes substantially greater than 3°, the angle of incidence is then materially less than 42° and a large part of the light of light ray 25 will be transmitted as indicated by the emerging light ray 25'.

Light ray 24 on the other hand will strike the surface 22 of the prism at angles of incidence greater than 45°; consequently, light rays of which 24 is typical, will always be reflected from this surface 22. When this light ray is reflected over to the other side of the prism 23 it will be on the wrong side of light ray 21 for total reflection, and if 21 and 24 are more than 3° apart the light ray 24 will be transmitted as indicated by 24'. Some of this light 24' will enter the next prism and may be recovered but some of it will not enter this prism and, in any event, there will be losses through additional refraction and reflection and absorption. Therefore, for purposes of reflection, with an index of refraction of 1.5, such light rays as 24 and 25 are likely to be lost when the lamp filament 3 is large enough to produce a spread of more than approximately 3° each side of the central ray after the light has entered the first surface of the glass. Filaments of this size are commonly encountered and it is desirable to overcome this element of inefficiency in prismatic reflectors.

The inefficiency may be overcome by increasing the index of refraction. For example, if the index of refraction is increased from 1.5 to 1.6 the critical angle is decreased from approximately 42° to approximately 39°; consequently, the spread of light which will be reflected by the prisms is increased from 3° each side of the central ray in glass to 6°. It is obvious that with lamp filaments of appreciable size, such an increase in the index of refraction of the glass will provide for the reflection of considerably more light than would occur with the original index of refraction.

Zirconia-containing silicate glass disclosed herein forms the subject-matter of divisional application, Serial No. 222,003, filed April 11, 1951,

What is claimed is:
A glass composition comprising:

| | Per cent |
|---|---|
| $SiO_2$ | 57½ |
| $Na_2O$ | 12 |
| $K_2O$ | 6 |
| BaO | 9½ |
| $TiO_2$ | 15 |

ISADORE MOCKRIN.
ARNOLD E. PAVLISH.

REFERENCES CITED

The following references are of record in the file of this patent:

UNITED STATES PATENTS

| Number | Name | Date |
|---|---|---|
| 1,362,917 | Barton, et al. | Dec. 21, 1920 |
| 2,444,845 | Perley | July 6, 1948 |

FOREIGN PATENTS

| Number | Country | Date |
|---|---|---|
| 92,338 | Austria | 1923 |

OTHER REFERENCES

Eitel-Pirani-Scheel: Glastechnische Tabellen (1932), p. 662.